United States Patent Office 2,849,306
Patented Aug. 26, 1958

2,849,306
HERBICIDAL METHOD AND COMPOSITION EMPLOYING ARYL PSEUDOUREAS

Norman E. Searle, Wilmington, Del., assignor to E. I. du Pont de Nemours and Company, Wilmington, Del., a corporation of Delaware No Drawing. Application March 19, 1954
Serial No. 417,503

2 Claims. (Cl. 71—2.6)

This invention relates to herbicidal compositions and methods employing certain pseudoureas and their salts as the essential active ingredients. The aryl pseudoureas, as indicated by the name, are characterized by the following structure:

(1)
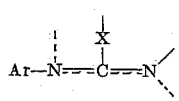

where Ar is a monovalent aromatic radical and X is oxygen or sulfur. The broken lines in Formula 1 above are used in the conventional sense to indicate that the double bond can be between one or the other of the nitrogen atoms and the intermediate carbon atom. Thus the compounds are those having the structure:

(2)
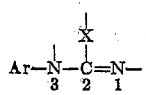

or (3)
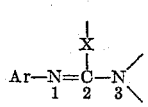

The free valences shown in the above compound can be variously substituted as will be described below, the important moiety contributing to herbicide activity being the above indicated pseudourea structures. More specifically, the pseudoureas of the invention are selected from compounds, and the salts thereof, represented by the formulas:

(4)
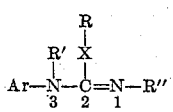

and (5)
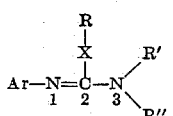

where Ar is a monovalent aromatic radical, X is oxygen or sulfur, R is an organic radical, and preferably lower alkyl or lower alkenyl and may contain one or more of various substituents such as fluorine and other halogens, nitro, hydroxy, methoxy, methylmercapto and the like; R' is hydrogen or an aliphatic radical and preferably lower alkyl or lower alkenyl and may have various substituents named above in connection with R; R" is hydrogen or an organic radical and preferably aliphatic or aromatic and may contain one or more substituents such as those named above in connection with R and R'. Ar may be any aryl or substituted aryl group such as phenyl, biphenyl, naphthyl, anthracyl and their substituted radicals, and preferably will be phenyl or substituted phenyl such as p-chlorophenyl, 3,4-dichlorophenyl and similar mono- or polyhalogenated phenyl, nitrophenyl, aminophenyl, methoxyphenyl, tolyl, xylyl, fluorotolyl, methylmercaptophenyl, methylsulfonylphenyl, and similar commonly substituted phenyl radicals.

The pseudoureas of the invention will most often be obtained in the form of their salts and they can be used as such. The salts can be represented as follows:

(6)
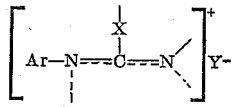

where Ar and X have the same significance given above, and Y is any anion such as halide, sulfate, phosphate, carbonate, nitrate, an anion of a fatty acid, and benzoate.

The anion represented by Y is comparatively indifferent and can be any anion. Ordinarily it will be a halide such as chlorine, bromine, iodine, or fluorine.

Y can also be the anion of fatty acids such as formic, acetic, propionic, butyric, caproic, caprylic, undecylic, lauric, myristic, palmitic, stearic, arachidic, carnauvic, melissic, montanic, carylic, crotanic, methylacrylic, tiglic, angelic, oleic, propiolic, tetrolic, amylpropiolic, sorbic, linoleic, and linolinic.

The pseudoureas and thiopseudoureas employed in the herbicidal composition and methods of this invention are suitably prepared by the following types of reaction. One method of preparation is described by Curd, Davey, and Richardson; J. Chem. Soc. 1737 (1949). The reaction may be described by the preparation of 3-(p-chlorophenyl)-2-methylpseudourea by the reaction of p-chlorophenylcyanamide with methyl alcohol in the presence of anhydrous hydrogen chloride.

(7)
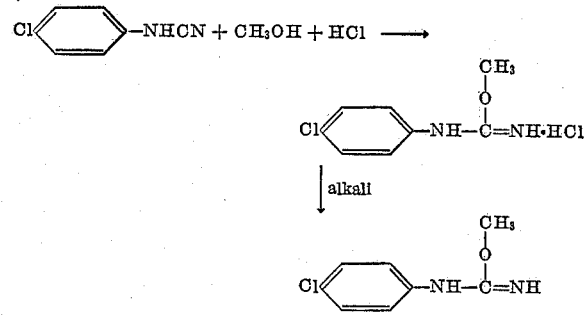

A second method of preparation is described by Lengfeld and Stieglitz, Am. Chem. J., 17, 112–113 (1895). This reaction may be illustrated by the preparation of 1,3-diphenyl-2-ethylpseudourea by the treatment of carbodiphenylimide with anhydrous hydrogen chloride followed by sodium ethoxide:

(8)
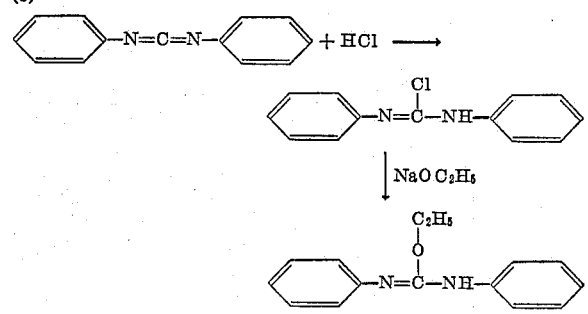

A preparation of a thiopseudourea is described in the literature by Crowther, Curd, and Rose, J. Chem. Soc., 590 (1948). This reaction illustrates the preparation of 3-(p-chlorophenyl) - 2 - methyl - 2 - thiopseudourea by the treatment of p-chlorophenylthiourea with dimethyl sulfate:

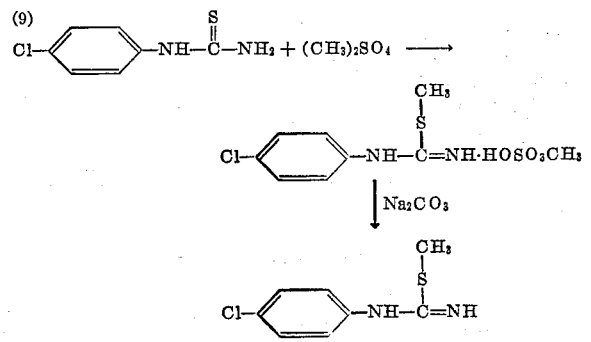

Herbicidal compositions of the invention are prepared by admixing one or more of the aryl pseudoureas defined heretofore, in herbicidally effective amounts, with a conditioning agent of the kind used and referred to in the art as a pest control adjuvant or modifier to provide formulations adapted for ready and efficient application to soil or weeds (i. e., unwanted plants) using conventional applicator equipment.

Thus the herbicidal compositions or formulations are prepared in the form of solids or liquids. Solid compositions are preferably in the form of dusts and are compounded to give homogeneous free-flowing dusts by admixing the active compound or compounds with finely divided solids preferably talcs, natural clays, pyrophyllite, diatomaceous earth or flours such as walnut shell, wheat, redwood, soya bean, cottonseed flours and other inert solid conditioning agents or carriers of the kind conventionally employed in preparing pest control compositions in dusts or powdered form.

Liquid compositions of the invention are prepared in the usual way by admixing one or more of the aryl pseudoureas with a suitable liquid diluent media. With certain solvents such as alkylated naphthalene, dimethylformamide, and cresol, relatively high, up to about 35% by weight or more, concentrations of the aryl pseudoureas can be obtained in solution. Other liquids conventionally used in preparing liquid herbicidal compositions are for the most part less effective solvents.

The herbicidal compositions of the invention whether in the form of dusts or liquids preferably also include a surface-active agent of the kind sometimes referred to in the art as a wetting, dispersing, or emulsifying agent. These agents, which will be referred to hereinafter more simply as surface-active dispersing agents, cause the compositions to be easily dispersed in water to give aqueous sprays which, for the most part, constitutes a desirable composition for application.

The surface-active dispersing agents employed can be of the anionic, cationic, or nonionic type and include, for example, sodium and potassium oleate, the amine salts of oleic acid such as morpholine and dimethylamine oleates, the sulfonated animal and vegetable oils such as sulfonated fish and castor oils, sulfonated petroleum oils, sulfonated acyclic hydrocarbons, sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol oleate, polyethylene oxides, ethylene oxide condensation products with stearyl alcohol and octylphenol, polyvinyl alcohols, salts, such as the acetate of polyamines from reductive amination of ethylene/carbon monoxide polymers, laurylamine hydrochloride, laurylpyridinium bromide, stearyltrimethylammonium bromide, cetyldimethylbenzyl ammonium chloride, lauryldimethylamine oxide, and the like. Generally, the surface-active agent will not comprise more than about 5 to 15% by weight of the composition, and in certain compositions the percentage will be 1% or less. Usually the minimum lower concentration will be 0.1%.

The herbicidal compositions are applied either as a spray or a dust to the locus or area to be protected from undesirable plant growth, commonly called weeds, i. e., plants growing where they are not wanted. Such application can be made directly upon the locus or area and the weeds thereon during the period of weed infestation in order to destroy the weeds, but preferably, the application is made in advance of an anticipated weed infestation to prevent such infestation. Thus, the compositions can be applied as aqueous foliar sprays but can also be applied as sprays directly to the surface of the soil. Alternatively, the dry powdered compositions can be dusted directly on the plants or on the soil.

The active compound is, of course, applied in amount sufficient to exert the desired herbicidal action. The amount of the active compound present in the compositions as actually applied for destroying or preventing weeds will vary with the manner of application, the particular weeds for which control is sought, the purpose for which the application is being made, and like variables. In general, the herbicidal compositions as applied in the form of a spray or a dust will contain from about 0.5% to 85% by weight of aryl pseudoureas.

Fertilizer materials, other herbicidal agents, and other pest control agents such as insecticides and fungicides can be included in the herbicidal compositions of the invention if desired.

In order that the invention may be better understood, the following examples are given in addition to the examples already given above.

EXAMPLE 1

A total of 13.3 parts by weight of N-methyl-N-p-chlorophenylcyanamide, 150 parts of absolute methanol containing 5.6 parts by weight of potassium hydroxide was combined and refluxed for one hour. The mixture was run with agitation into 800 ml. of cold water, and extracted thoroughly with ether. The ether extract was dried over anhydrous magnesium sulfate, filtered, and the solvent evaporated. The oil was further evacuated at 0.2 mm. Hg for one hour with careful warming to remove the last traces of solvent. A clear, viscous oil remained which weighed 14.5 grams (91% yield). Refractive index $N_D^{21}$ 1.5527. The product, which is 3-(p-chlorophenyl)-2,3-dimethylpseudourea, was not purified further.

*Analysis.*—Calcd. for $C_9H_{11}ClN_2O$: N, 14.10; Cl, 17.86. Found: N, 13.64, 13.60; Cl, 17.21, 17.32.

The herbicidal properties of the aryl pseudoureas are illustrated by the results obtained from application of an aqueous spray containing as the active ingredient only 1% of the compound prepared as described above in this example. Tomato plants thus treated showed serious injury within two days after application of the composition.

EXAMPLE 2

*Dust formulation*

The following composition is adapted for direct application as a dust for the destruction or prevention of weeds using conventional dusting equipment. The dust is made by blending or mixing the ingredients and grinding the mix to give a composition having an average particle size less than about 50 microns.

| | |
|---|---|
| 1-(p - chlorophenyl) - 2, 3 - dimethylpseudourea | 20 |
| Talc | 80 |
| | 100 |

EXAMPLE 3

Water-dispersible powder

The following powdered composition is adapted for dispersing in water for application as a spray for the destruction and prevention of weeds. The powdered composition is made by intimately mixing the listed ingredients using conventional mixing or blending equipment and then grinding the mixture to give a powder having an average particle size less than about 50 microns.

| | |
|---|---|
| 1 - (3,4 - dichlorophenyl) - 2,3 - dimethyl - 2-thiopseudourea | 75 |
| Fuller's earth | 23.75 |
| Sodium lauryl sulfate, 50% (wetting agent) | 1 |
| Methyl cellulose, 15 cps. (dispersing agent) | .25 |
| | 100 |

EXAMPLE 4

Oil-water dispersible powder

The following powdered composition is adapted for use in the preparation of a spray composition using either an oil, water, or a combination of oil and water as the liquid diluent. The powder is made by mixing and grinding as in the case of the powder of Example 2.

| | |
|---|---|
| 2,3 - dimethyl - 3 - phenylpseudourea | 70 |
| Alkylated aryl polyether alcohol (wetting and dispersing agent) | 4 |
| Fuller's earth | 26 |
| | 100 |

EXAMPLE 5

Water-dispersible liquid composition

The following composition is in a liquid form and is adapted for addition to water to give an aqueous dispersion for application as a spray. The urea herbicides are generally quite insoluble in most oils. Therefore, the liquid compositions ordinarily are not complete solutions but rather are dispersions of solid in an oil. The liquid or fluid composition shown is prepared by thoroughly mixing and dispersing the active compound and conditioning agent in an organic liquid diluent.

| | |
|---|---|
| 1 - phenyl - 2,3 - dimethyl - 3 - ethyl - 2 - thiopseudourea | 25 |
| Long chain fatty alcohol sulfate (emulsifying agent) | 2 |
| Goulac (dispersing agent) | 3 |
| Kerosene | 70 |
| | 100 |

EXAMPLE 6

Granular composition

The following composition is adapted for application by means of a fertilizer spreader apparatus or similar equipment. The composition is readily prepared by mixing the ingredients with water to form a paste. The paste is then extruded, dried, and ground to give the desired granular size. Preferably, the granules will be in the order of one-thirty second to one-quarter inch diameter.

| | |
|---|---|
| 2,3 - dimethyl - 3 - (3 - chloro-p-tolyl) - 2 - thiopseudourea, methyl sulfate | 10 |
| Goulac (dispersing agent) | 3 |
| Hydrocarbon oil | 1 |
| Dextrin (binding agent) | 20 |
| Fuller's earth | 66 |
| | 100 |

The following compounds which can be prepared according to the methods described hereinabove are given as further examples of aryl pseudoureas employed in compositions and methods of the invention. It will be understood that such compounds can be used in place of the various compounds specifically shown in the foregoing detailed examples.

1. 2-methyl-3-phenylpseudourea
2. 3-(p-chlorophenyl)-2-methylpseudourea
3. 3-(p-bromophenyl)-2-methylpseudourea
4. 3-(3,4-dichlorophenyl)-2-methylpseudourea
5. 2-methyl-3-(3,4,5-trichlorophenyl)-pseudourea
6. 2-methyl-3-(m-tolyl)-pseudourea
7. 3-(p-aminophenyl)-2-methylpseudourea
8. 2-methyl-3-(p-nitrophenyl)pseudourea
9. 3-(p-methoxyphenyl)-2-methylpseudourea
10. 2-methyl-3-(3,4-xylyl)pseudourea
11. 3-(4-chloro-m-tolyl)-2-methylpseudourea
12. 2-methyl-3-(p-methylmercaptophenyl)pseudourea
13. 2-methyl-3-(p-methylsulfonylphenyl)pseudourea
14. 3-(p-chlorophenyl)-2-ethylpseudourea
15. 3-(p-chlorophenyl)-2-(1-propyl)pseudourea
16. 3-(p-chlorophenyl)-2-(2-propyl)pseudourea
17. 2-(1-butyl)-3-(p-chlorophenyl)pseudourea nitrate
18. 3-(p-chlorophenyl)-2-(1-hexyl)pseudourea
19. 3-(p-chlorophenyl)-2-(1-dodecyl)pseudourea
20. 2-allyl-3-(p-chlorophenyl)pseudourea
21. 2-(2-chloroethyl)-3-(p-chlorophenyl)pseudourea
22. 3-(p-chlorophenyl)-2,3-dimethylpseudourea hydrochloride
23. 3-(p-chlorophenyl)-3-ethyl-2-methylpseudourea
24. 3-(p-chlorophenyl)-2-methyl-3-(1-propyl)pseudourea acetate
25. 3-(p-chlorophenyl)-2-methyl-3-(2-propyl)pseudourea
26. 3-(1-butyl)-3-(p-chlorophenyl)-2-methylpseudourea
27. 3-(p-chlorophenyl)-3-(1-hexyl)-2-methylpseudourea
28. 3-(p-chlorophenyl)-3-(1-dodecyl) - 2 - methylpseudourea
29. 3-allyl-3-(p-chlorophenyl)-2-methylpseudourea
30. 3-(2-choloroethyl) - 3 - (p-chlorophenyl) - 2 - methylpseudourea
31. 1,3-(diphenyl)-2-methylpseudourea
32. 1,3-di-(p-chlorophenyl)-2-methylpseudourea
33. 1,3-di-(p-bromophenyl)-2-methylpseudourea
34. 1,3-di-(3,4-dichlorophenyl)-2-methylpseudourea
35. 1,3-di-(3,4,5-trichlorophenyl)-2-methylpseudourea
36. 1,3-di-(m-tolyl)-2-methylpseudourea
37. 1,3-di-(3,4-xylyl)-2-methylpseudourea
38. 1,3-di-(4-chloro-m-tolyl)-2-methylpseudourea
39. 2,3-dimethyl-phenylpseudourea
40. 3-(p-bromophenyl)-2,3-dimethylpseudourea
41. 3-(3,4-dichlorophenyl)-2,3-dimethylpseudourea
42. 2,3-dimethyl-3-(3,4,5-trichlorophenyl)pseudourea
43. 2,3-dimethyl-3-(m-tolyl)pseudourea
44. 3-(p-aminophenyl)-2,3-dimethylpseudourea
45. 2,3-dimethyl-3-(p-nitrophenyl)pseudourea
46. 2,3-dimethyl-3-(p-methoxyphenyl)pseudourea
47. 2,3-dimethyl-3-(3,4-xylyl)pseudourea
48. 3-(4-chloro-m-tolyl)-2,3-dimethylpseudourea
49. 2,3-dimethyl-3-(p-methylmercaptophenyl)pseudourea
50. 2,3-dimethyl-3-(p-methylsulfonylphenyl)pseudourea
51. 3-(p-chlorophenyl)-2-ethyl-3-methylpseudourea
52. 3-(p-chlorophenyl)-3-methyl-2-(1-propyl)pseudourea
53. 3-(p-chlorophenyl)-3-methyl-2-(2-propyl)pseudourea
54. 2 - (1-butyl)-3-(p-chlorophenyl)-3-methylpseudourea hydrochloride
55. 3-(p-chlorophenyl)-2-(1-dodecyl) - 3 - methylpseudourea
56. 2-allyl-3-(p-chlorophenyl)-3-methylpseudourea
57. 2-(2-chloroethyl) - 3 - (p - chlorophenyl) - 3 - methylpseudourea
58. 2-methyl-3-phenyl-2-thiopseudourea hydrobromide
59. 3-(p-chlorophenyl)-2-methyl-2-thiopseudourea
60. 3-(p-bromophenyl)-2-methyl-2-thiopseudourea
61. 3-(3,4-dichlorophenyl)-2-methyl-2-thiopseudourea
62. 2-methyl-3-(3,4,5-trichlorophenyl)-2-thiopseudourea
63. 2-methyl-3-(m-tolyl)-2-thiopseudourea 64. 3-(p-aminophenyl)-2-methyl-2-thiopseudourea
65. 2-methyl-3-(p-nitrophenyl)-2-thiopseudourea
66. 2-methyl-3-(p-methoxyphenyl)-2-thiopseudourea
67. 2-methyl-3-(3,4-xylyl)-2-thiopseudourea
68. 3-(4-chloro-m-tolyl)-2-methyl-2-thiopseudourea
69. 2-methyl-3-(p-methylmercaptophenyl)-2-thiopseudourea
70. 2-methyl-3-(p-methylsulfonylphenyl) - 2 - thiopseudourea
71. 3-(p-chlorophenyl)-2-ethyl-2-thiopseudourea
72. 2-(1-butyl)-3-(p-chlorophenyl)-2-thiopseudourea
73. 3-(p-chlorophenyl)-2-(1-propyl)-2-thiopseudourea
74. 3-(p-chlorophenyl)-2-(2-propyl)-2-thiopseudourea
75. 3-(p-chlorophenyl)-2-(1-hexyl)-2-thiopseudourea
76. 3-(p-chlorophenyl)-2-(1-dodecyl)-2-thiopseudourea
77. 2-allyl-3-(p-chlorophenyl)-2-thiopseudourea
78. 2 - (2-chloroethyl)-3-(p-chlorophenyl)-2-thiopseudourea
79. 3-(p-chlorophenyl)-2,3-dimethyl-2-thiopseudourea
80. 3-(p-chlorophenyl)-3-ethyl-2-methyl - 2 - thiopseudourea hydrobromide
81. 3-(p-chlorophenyl)-2-methyl-3-(1 - propyl) - 2 - thiopseudourea
82. 3-(p-chlorophenyl)-2-methyl-3-(2 - propyl) - 2 - thiopseudourea
83. 3-butyl-3-(p-chlorophenyl)-2-methyl - 2 - thiopseudourea
84. 3-(p-chlorophenyl)-3-(1-hexyl) - 2 - methyl - 2 - thiopseudourea
85. 3-(p-chlorophenyl)-3-(1-dodecyl)-2-methyl - 2 - thiopseudourea
86. 3-allyl-3-(p-chlorophenyl)-2-methyl-3-thiopseudourea
87. 3-(2-chloroethyl)-3-(p - chlorophenyl) - 2 - methyl-2-thiopseudourea
88. 3-(p-chlorophenyl)-1,2-dimethyl-2-thiopseudourea
89. 3-(p-chlorophenyl)-1-ethyl-2-methyl - 2 - thiopseudourea
90. 3-(p-chlorophenyl)-2-methyl-1-(1 - propyl) - 2 - thiopseudourea
91. 3-(p-chlorophenyl)-2-methyl-1-(2 - propyl) - 2 - thiopseudourea
92. 3-(p-chlorophenyl)-1-(1-dodecyl)-2-methyl - 2 - thiopseudourea
93. 3 - (p-chlorophenyl)-2-methyl-1-phenyl-2-thiopseudourea
94. 3-(p - chlorophenyl) - 1 - (3,4 - dichlorophenyl) - 2-methyl-2-thiopseudourea
95. 3-(p-chlorophenyl)-2-methyl-1-(m - tolyl) - 2 - thiopseudourea
96. 1-(4-chloro-m-tolyl)-3-(p-chlorophenyl) - 2 - methyl-2-thiopseudourea
97. 3-(p-chlorophenyl)-1,2,3-trimethyl - 2 - thiopseudourea
98. 1,3-diphenyl-2-methyl-2-thiopseudourea
99. 1,3-di-(p-chlorophenyl)-2-methyl-2-thiopseudourea
100. 1,3-(3,4-dichlorophenyl)-2-methyl-2-thiopseudourea
101. 1,3-di-(m-tolyl)-2-methyl-2-thiopseudourea
102. 1,3-di-(4-chloro-m-tolyl)-2-methyl-2-thiopseudourea
103. 2,3-dimethyl-3-phenyl-2-thiopseudourea
104. 3-(p-bromophenyl)-2,3-dimethyl-2-thiopseudourea
105. 3-(3,4-dichlorophenyl)-2,3-dimethyl - 2 - thiopseudourea
106. 2,3-dimethyl-(3,4,5-trichlorophenyl - 2 - thiopseudourea
107. 2,3-dimethyl-3-(m-tolyl)-2-thiopseudourea
108. 3-(p-aminophenyl)-2,3-dimethyl - 2 - thiopseudourea methyl sulfate
109. 2,3-dimethyl-3-(p-nitrophenyl)-2-thiopseudourea
110. 2,3-dimethyl-3-(p-methoxyphenyl)-2-thiopseudourea
111. 2,3-dimethyl-3-(3,4-xylyl)-2-thiopseudourea
112. 3-(4-chloro-m-tolyl)-2,3-dimethyl - 2 - thiopseudourea
113. 2,3-dimethyl-3-(p-methylmercaptophenyl) - 2 - thiopseudourea
114. 2,3-dimethyl-3-(p-methylsulfonylphenyl) - 2 - thiopseudourea
115. 3-(p-chlorophenyl) - 2 - ethyl - 3 - methyl - 2 - thiopseudourea
116. 3-(p-chlorophenyl)-3-methyl-2-(1-propyl) - 2 - thiopseudourea
117. 3-(p-chlorophenyl)-3-methyl-2-(2-propyl) - 2 - thiopseudourea
118. 2-(1-butyl)-3-(p-chlorophenyl)-3-methyl - 2 - thiopseudourea
119. 3-(p-chlorophenyl)-2-(1-hexyl)-3-methyl - 2 - thiopseudourea
120. 3-(p-chlorophenyl)-2-(1-dodecyl)-3-methyl-2 - thiopseudourea
121. 2-allyl-3-(p-chlorophenyl)-3-methyl - 2 - thiopseudourea
122. 2-(2-chloroethyl)-3-(p-chlorophenyl) - 3 - methyl-2-thiopseudourea
123. 3-(p-chlorophenyl)-1-ethyl-2,3-dimethyl - 2 - thiopseudourea
124. 3-(p-chlorophenyl)-2,3-dimethyl-1-(1 - propyl) - 2-thiopseudourea
125. 3-(p-chlorophenyl)-2,3-dimethyl-1-(2 - propyl) - 2-thiopseudourea
126. 3-(p-chlorophenyl)-1-(1-hexyl)2,3 - dimethyl - 2-thiopseudourea
127. 3-(p-chlorophenyl)-1-(1-dodecyl) - 2,3 - dimethyl-2-thiopseudourea
128. 1 - allyl - 3 - (p - chlorophenyl) - 2,3 - dimethyl - 2-thiopseudourea
129. 1,3 - di - (p - chlorophenyl) - 2,3 - dimethyl - 2-thiopseudourea
130. 1 - (p - bromophenyl) - 3 - (p - chlorophenyl)-2,3-dimethyl-2-thiopseudourea
131. 3 - (p - chlorophenyl) - 1 - (3,4 - dichlorophenyl)-2,3-dimethyl-2-thiopseudourea
132. 3 - (p - chlorophenyl) - 2,3 - dimethyl - 1 - (3,4,5-trichlorophenyl)-2-thiopseudourea
133. 3 - (p - chlorophenyl) - 2,3 - dimethyl - 1 - (m-tolyl)-2-thiopseudourea
134. 3 - (p - chlorophenyl) - 2,3 - dimethyl - 1 - (3,4-xylyl)-2-thiopseudourea
135. 3 - (p - chlorophenyl) - 1 - (4 - chloro - m - tolyl)-2,3-dimethyl-2-thiopseudourea
136. 3-(p-chlorophenyl)-1,2-dimethylpseudourea
137. 3-(p-chlorophenyl)-1-ethyl-2-methylpseudourea
138. 3 - (p - chlorophenyl) - 2 - methyl - 1 - (1 - propyl) pseudourea
139. 3 - (p - chlorophenyl) - 2 - methyl - 1 - (2 - propyl) pseudourea
140. 1-(1-butyl)-3-(p-chlorophenyl)-2-methylpseudourea
141. 3-(p-chlorophenyl)-1-(1-hexyl)-2-methylpseudourea
142. 3 - (p - chlorophenyl) - 1 - (1 - dodecyl) - 2 - methylpseudourea
143. 1-allyl-3-(p-chlorophenyl)-2-methylpseudourea
144. 1 - (2 - chloroethyl) - 3 - (p - chlorophenyl) - 2-methylpseudourea
145. 3-(p-chlorophenyl)-2-methyl-1-phenylpseudourea
146. 1 - (p - bromophenyl) - 3 - (p - chlorophenyl) - 2-methylpseudourea
147. 3 - (p - chlorophenyl) - 1 - (3,4 - dichlorophenyl)-2-methylpseudourea
148. 3 - (p - chlorophenyl) - 2 - methyl - 1 - (3,4,5 - trichlorophenyl)pseudourea
149. 3-(p-chlorophenyl)-2-methyl-1-(m-tolyl)pseudourea
150. 3 - (p - chlorophenyl) - 2 - methyl - 1 - (3,4 - xylyl) pseudourea
151. 3 - (p - chlorophenyl) - 1 - (4 - chloro - m - tolyl)-2-methylpseudourea
152. 3-(p-chlorophenyl)-1,2,3-trimethylpseudourea
153. 3-(p-chlorophenyl)-2,3-dimethyl-1-ethylpseudourea
154. 3 - (p - chlorophenyl) - 2,3 - dimethyl - 1 - (1 - propyl)pseudourea
155. 3 - (p - chlorophenyl) - 2,3 - dimethyl - 1 - (2 - propyl)pseudourea 156. 1 - (1 - butyl) - 3 - (p - chlorophenyl) - 2,3 - dimethylpseudourea
157. 3 - (p - chlorophenyl) - 2,3 - dimethyl - 1 - (1 - hexyl)pseudourea
158. 3 - (p - chlorophenyl) - 2,3 - dimethyl - 1 - (1 - dodecyl)pseudourea
159. 1-allyl-3-(p-chlorophenyl)2,3-dimethylpseudourea
160. 3 - (p - chlorophenyl) - 2,3 - dimethyl - 1 - phenylpseudourea
161. 1,3-di-(p-chlorophenyl)-2,3-dimethylpseudourea
162. 1 - (p - bromophenyl) - 3 - (p - chlorophenyl) - 2,3-dimethylpseudourea
163. 3 - (p - chlorophenyl) - 1 - (3,4 - dichlorophenyl)-2,3-dimethylpseudourea
164. 3 - (p - chlorophenyl) - 2,3 - dimethyl - 1 - (3,4,5-trichlorophenyl)pseudourea
165. 3 - (p - chlorophenyl) - 2,3 - dimethyl - 1 - (m-tolyl)pseudourea
166. 3 - (p - chlorophenyl) - 2,3 - dimethyl - 1 - (3,4-xylyl)pseudourea
167. 3 - (p - chlorophenyl) - 1 - (4 - chloro - m - tolyl)-2,3-dimethylpseudourea It should be noted that in the nomenclature used in the foregoing description of the compounds employed in the compositions and methods of the invention, the numbering of the substituents is in accordance with the numbering shown on the skeleton formulas hereinabove mentioned; in other words, the nitrogen linked to the ureido carbon by a double bond is number 1, the other nitrogen, 3, and the ureido carbon is number 2.

Those skilled in the art will appreciate that other pseudoureas and thiopseudoureas can be prepared and employed in the compositions and methods of the invention. Thus, the foregoing detailed description has been given for clearness of understanding only, and no unnecessary limitations are to be understood therefrom.

I claim:

1. A method for the control of weeds which comprises applying to a locus to be protected, in amount sufficient to exert a herbicidal action, an aryl pseudourea selected from the group consisting of compounds represented by the formulas

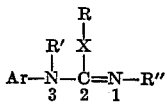

and

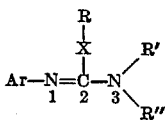

and the salts of said compounds, where Ar is selected from the group consisting of phenyl and substituted phenyl radicals, X is selected from the group consisting of oxygen and sulfur, R is selected from the group consisting of unsubstituted and halogen-substituted monovalent alkyl and monovalent alkenyl radicals containing from 1 through 6 carbon atoms, and R' and R" are selected from the group consisting of hydrogen and monovalent alkyl and monovalent alkenyl radicals containing from 1 through 12 carbon atoms, with the proviso that not more than 1 of R' and R" is hydrogen.

2. A herbicidal composition comprising an inert solid pest control adjuvant and in amount sufficient to exert herbicidal action an aryl pseudourea selected from the group consisting of compounds represented by the formula

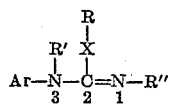

and

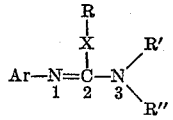

and the salts of said compounds, where Ar is selected from the group consisting of phenyl and substituted phenyl radicals, X is selected from the group consisting of oxygen and sulfur, R is selected from the group consisting of unsubstituted and halogen-substituted monovalent alkyl and monovalent alkenyl radicals containing from 1 through 6 carbon atoms, and R' and R" are selected from the group consisting of hydrogen and monovalent alkyl and monovalent alkenyl radicals containing from 1 through 12 carbon atoms, with the proviso that not more than 1 of R' and R" is hydrogen.

References Cited in the file of this patent

UNITED STATES PATENTS

| | | |
|---|---|---|
| 2,302,762 | Graenacher et al. | Nov. 24, 1942 |
| 2,336,868 | Jayne | Dec. 14, 1943 |
| 2,547,366 | Bock et al. | Apr. 3, 1951 |
| 2,624,762 | Dovney | Jan. 6, 1953 |
| 2,655,447 | Todd | Oct. 13, 1953 |

OTHER REFERENCES

Basterfield et al., "Acyl Iso Ureas," J. A. C. S., vol. 49, December 1926, pages 3177 to 3180, inclusive.

Thompson et al., in "Botanical Gazette," vol. 107, 1946, pages 475 to 507 (page 494 applied).

Dicke et al., "The Acute Toxicity of Thioureas and Related Compounds to Wild and Domestic Norway Rats," Journal of Pharmacology, vol. 90, 1947, pages 260–270, inclusive.

Elderfield et al., in Chemical Abstracts, vol. 47, 1688(e), February 25, 1953 (Abstract of article in J. Org. Chem., vol. 17; pages 431 to 441, inclusive, 1952).